US012508789B2

(12) United States Patent
Sahin et al.

(10) Patent No.: US 12,508,789 B2
(45) Date of Patent: Dec. 30, 2025

(54) CORNET CONE PACKAGE CUTTING MACHINE FROM PACKAGE BOBBIN

(71) Applicant: Mondi Kale Nobel Ambalaj Sanayi Ve Ticaret Anonim Sirketi, Istanbul (TR)

(72) Inventors: Umit Sahin, Kirklareli (TR); Mehmet Ulas Ipek, Istanbul (TR)

( * ) Notice: Subject to any disclaimer, the term of this patent is extended or adjusted under 35 U.S.C. 154(b) by 0 days.

(21) Appl. No.: 18/849,900

(22) PCT Filed: Aug. 2, 2022

(86) PCT No.: PCT/TR2022/050810
§ 371 (c)(1),
(2) Date: Sep. 23, 2024

(87) PCT Pub. No.: WO2023/195943
PCT Pub. Date: Oct. 12, 2023

(65) Prior Publication Data
US 2025/0162274 A1 May 22, 2025

(30) Foreign Application Priority Data
Apr. 8, 2022 (TR) ................................ 2022/005636

(51) Int. Cl.
*B31B 70/18* (2017.01)
*B31B 160/30* (2017.01)

(52) U.S. Cl.
CPC .......... *B31B 70/18* (2017.08); *B31B 2160/30* (2017.08)

(58) Field of Classification Search
CPC ......... B31B 50/98; B31B 50/16; B31B 70/18; B31B 2160/30; B31C 99/00; B31C 7/08
See application file for complete search history.

(56) References Cited

U.S. PATENT DOCUMENTS 4,451,249 A * 5/1984 deBin .................... B31B 70/16 493/926
6,200,406 B1 3/2001 Ito

FOREIGN PATENT DOCUMENTS

EP 2535186 A1 12/2012
JP H0994896 A 4/1997
KR 20080040474 A 5/2008

OTHER PUBLICATIONS

International Search Report for corresponding PCT/TR2022/050810, dated Feb. 13, 2023.
Written Opinion of the International Searching Authority for corresponding PCT/TR2022/050810, dated Feb. 13, 2023.

* cited by examiner

*Primary Examiner* — Thomas M Wittenschlaeger
(74) *Attorney, Agent, or Firm* — Egbert, McDaniel & Swartz, PLLC

(57) ABSTRACT

Disclosed is a cornet cone package cutting machine used in the production of cornet cone packages that are used in the packaging of cornet-type ice-creams.

5 Claims, 2 Drawing Sheets

CORNET CONE PACKAGE CUTTING MACHINE FROM PACKAGE BOBBIN

TECHNICAL FIELD

Figure 1:
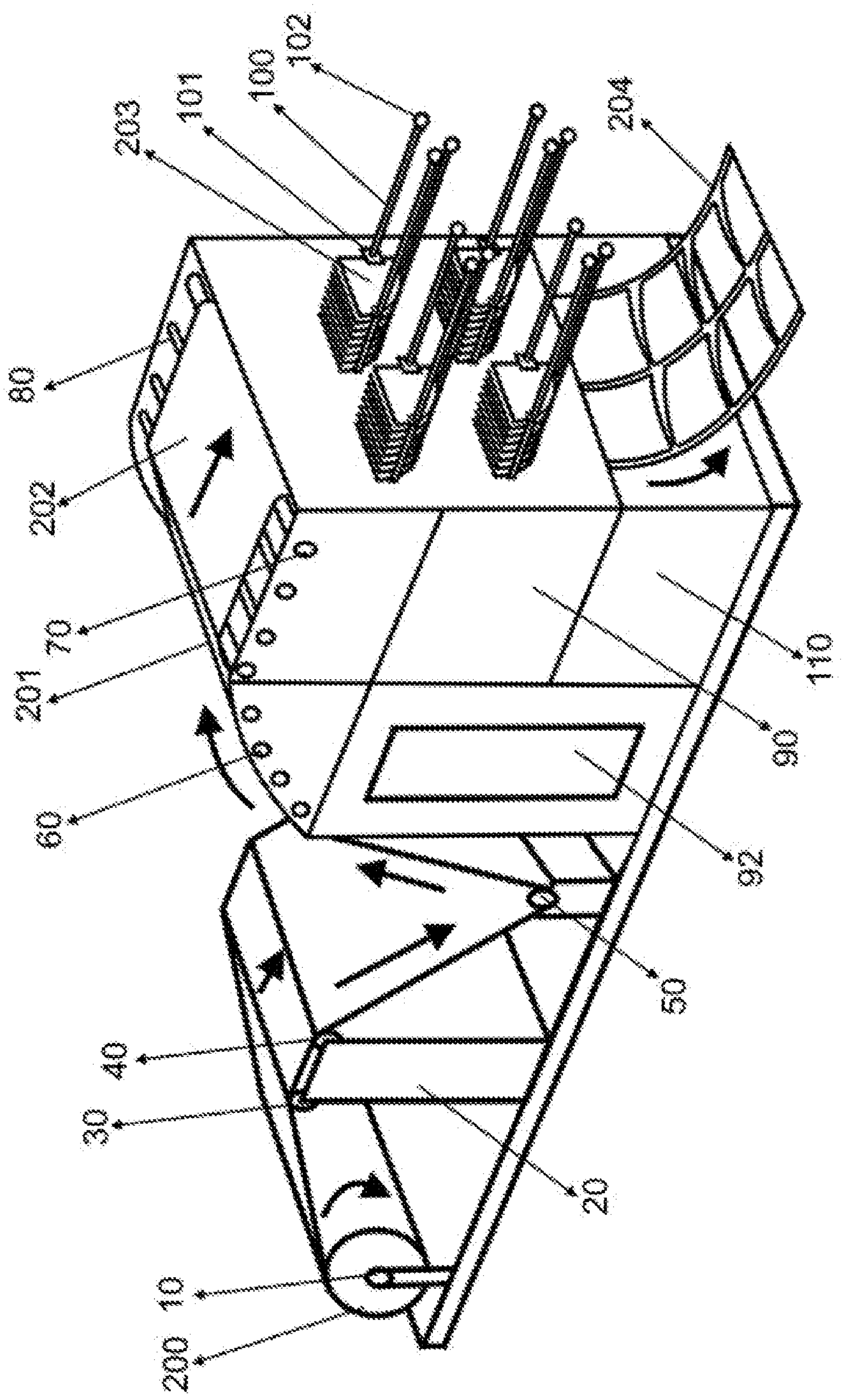

The invention is related to a cornet cone package cutting machine from a package bobbin used in the production of cornet cone packages that are used in the packaging of cornet-type ice-creams.

The invention is particularly related to a cornet cone package cutting machine which provides that cornet cone packages in bobbin form are cut.

PRIOR ART

Cornet-type ice-creams are among the top popular ice-creams frequently consumed. These ice-creams basically have conically shaped cornets filled with ice-creams having contents such as chocolate, toppings, fruits, nuts etc. Said cornets are sold by being placed in sleeve-like packages that cover the cornet part.

In the art, the standard cornet cone packages are cut into specific shapes in cutting machines before production and produced by being crimped into a conical shape in crimping machines. In said cutting machines cutting of narrow packages is performed and there are no cylindrical structures which provide for the straightening of the package by stretching it before the cutting process. Depending on the use of narrow packages, the number of cut pieces decreases and errors can occur with the cutting process since sufficient stretching is not provided for the package.

As a result of the research of the literature, document number EP1864791 can be given as an example of the known state of the art. Said document is related to the procedure for the production of conical ice-cream packages. In said invention, the production of the cornet cone packages after a four-step procedure has been mentioned. In the first stage the package bobbin which advances in a straight manner like a rug is divided into specifically shaped stripes by means of a custom knife structure and having been divided into specific shapes the bobbin comes out of the machine in two ways as plane or reverse. In the second stage, the reverse stripe is turned by a turning machine and readied for the cutting machine. In the third stage, the bobbins prepared are transferred to the crimping machine by being subjected to a cutting procedure and in the fourth stage, the pieces coming out of the cutting machine are transformed into cone packages by crimping. In said invention, the package which advances in a straight manner like a rug is cut and brought to a cone shape by being crimped.

In consequence, the presence of the above-mentioned problems and the inefficiency of the present solutions requires a development in the related technical field.

PURPOSE OF THE INVENTION

The present invention is related to a cornet cone package cutting machine from a package bobbin that eliminates the above-mentioned disadvantages and brings new advantages to the related technical field.

The purpose of the invention is to present a cornet cone package cutting machine which provides for the cutting of cornet cone packages in bobbin form.

The purpose of the invention is to provide that package bobbins having a broad structure are cut.

Another purpose of the invention is to provide that package bobbins are stretched and straightened after being opened by means of cylinders and cut without error.

In order to fulfill the above-mentioned purposes and the ones that can be inferred from the detailed description; the invention is a cornet cone package cutting machine which is used in the production of the cornet cone packages which are used in the packaging of cornet-type ice-creams, comprising a bobbin cylinder which carries the package bobbin, a stretching elevation which is positioned at a certain distance opposite the bobbin cylinder, a front stretching cylinder and rear stretching cylinder which are located on the stretching elevation, and which pull the package bobbin on the bobbin cylinder open, a lower stretching cylinder which is positioned at a certain distance opposite the stretching elevation, and which pulls the package that has been opened by the front stretching cylinder and rear stretching cylinder downwards and transfers the same upwards, a first straightening cylinder which pulls the package that has been transferred from the lower stretching cylinder upwards and turns it into a stretched package through stretching by passing the same through, a second straightening cylinder which is connected to the straightening disks located opposite the first straightening cylinder and which straightens the stretched package and makes it a straightened package, at least one compression piece with back-and-forth motion which is positioned under the second straightening cylinders and which presses the straightened package, and a compression chamber which has at least one mould that cuts the straightened package pressed within the compression piece and turns the same into specially cut package slices for cornet cones, a package holder arm which extends forward from the outer surface of the compression chamber and stacks the specially cut package slices obtained in the compression chamber thereon, a waste transmission portion under the compression chamber which transfers the waste packages left from the specially cut package slices cut from straightened package out, in order to be reused.

The structural and characteristic features and all the advantages of the invention will be understood more clearly thanks to the figures given below and the detailed description written by making references to these figures. Therefore, the evaluation should be made in consideration of these figures and the detailed description.

FIGURES AIDING THE DESCRIPTION OF THE INVENTION

FIG. 1: Representative view of the cutting machine of the invention.

Figure 2:
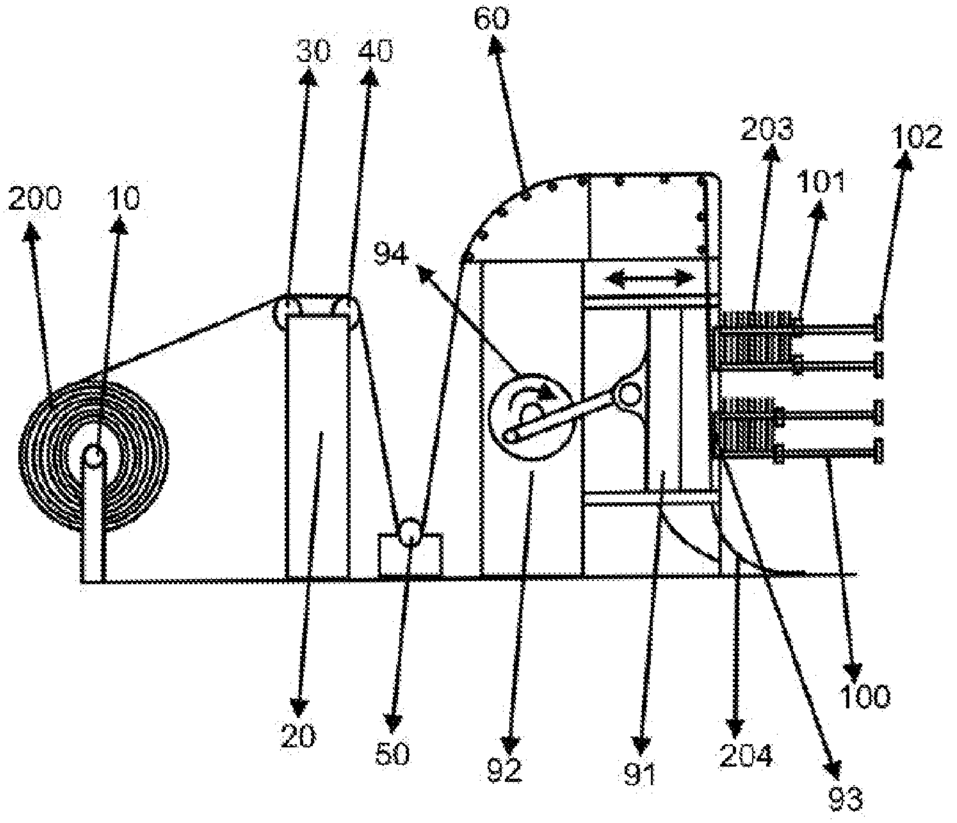

FIG. 2: Side view of the cutting machine of the invention.

DESCRIPTION OF THE REFERENCE PARTS

10. Bobbin cylinder
20. Stretching elevation
30. Front stretching cylinder
40. Rear stretching cylinder
50. Lower stretching cylinder
60. First straightening cylinder
70. Straightening disk
80. Second straightening cylinder

90. Compression chamber
91. Compression piece
92. Drive motor
93. Mould
94. Circle arm
100. Package holder arm
101. Stack holder
102. Stacking stop
110. Waste transmission portion
200. Package bobbin
201. Stretched package
202. Straightened package
203. Specially cut package slice
204. Waste package

DETAILED DESCRIPTION OF THE INVENTION

In this detailed description the preferred alternatives of the cornet cone cutting machine of the invention are described only for a better understanding of the subject and in the way to create no limiting effect whatsoever.

In FIG. 1, representative view of the cornet cone cutting machine of the invention has been given. Accordingly, the cornet cone cutting machine basically comprises a bobbin cylinder (10) which carries the package bobbin (200), a stretching elevation (20) which is positioned at a certain distance opposite the bobbin cylinder (10), a front stretching cylinder (30) and rear stretching cylinder (40) which are located on the stretching elevation (20) and which pull the package bobbin (200) on the bobbin cylinder (10) open, a lower stretching cylinder (50) which pulls the package that has been opened by the front stretching cylinder (30) and rear stretching cylinder (40) downwards and transfers the same upwards, a first straightening cylinder (60) which pulls the package that has been transferred from the lower stretching cylinder (50) upwards and turns it into a stretched package (201) through stretching by passing the same through, a second straightening cylinder (80) which is connected to the straightening disks (70) and which straightens the stretched package (201) and makes it a straightened package (202), a compression piece (91) which presses the straightened package (202) and a compression chamber (90) which has a mould (93) that cuts the straightened package (202) pressed within the compression piece (91) and turns the same into specially cut package slices (203) for cornet cones, a package holder arm (100) which stacks the specially cut package slices (203) obtained in the compression chamber (90) thereon, and a waste transmission portion (110) which transfers the waste packages (204) left from the specially cut package slices (203) cut from straightened package (202) out, to reuse the same.

The cornet cone cutting machine according to the invention provides for the production of specially cut package slices (203) for cornet cones with a cutting procedure from the package bobbin (200). Said package bobbin (200) is carried on a bobbin cylinder (10). A stretching elevation (20) is positioned opposite the bobbin cylinder (10) at a certain distance. On said stretching elevation (20), there are a front stretching cylinder (30) and rear stretching cylinder (40) which pull the package bobbin (200) on the bobbin cylinder (10) open. It is provided that the stretching elevation (20), said front stretching cylinder (30) and rear stretching cylinder (40) are positioned above at a certain distance from the bobbin cylinder (10) and thereby the package bobbin (200) is pulled upwards and opened.

A lower stretching cylinder (50) is positioned opposite the stretching elevation (20) at a certain distance. Said lower stretching cylinder (50) transfers the package opened with the front stretching cylinder (30) and rear stretching cylinder (40) upwards in an orderly manner for the cutting procedure by pulling the same in the downward direction.

The package transferred from the lower stretching cylinder (50) is pulled upwards and stretched by being passed between the first straightening cylinders (60) and turned into a stretched package (201). There are straightening disks (70) opposite the first straightening cylinders (60). Second straightening cylinders (80) are connected to said straightening disks (70). The second straightening cylinders (80) straighten the stretched package (201) at the first straightening cylinder (60) and turns the same into the straightened package (202).

As seen in FIG. 2, there is a compression chamber (90) under the second straightening cylinders (80). In said compression chamber (90), there is at least one compression piece (91) with back-and-forth motion which presses the straightened package (202) transferred from the second straightening cylinders (80) and at least one mould (93) which cuts the straightened package (202) pressed at the compression piece (91) and turns the same into specially cut package slices (203). The movement of the straightened package (202) in the compression chamber (90) is arranged in a way to coincide with the pressing time of the compression piece (91).

The compression piece (91) gains the back-and-forth drive from a drive motor (92) that makes a rotational movement. The drive motor (92) and compression piece (91) are interconnected via a circle arm (94) located on the drive motor (92). The circle arm (94) transforms the rotational movement of the drive motor (92) into linear motion.

There are package holder arms (100) which extend forwards from the outer surface of the compression chamber (90). Said package holder arms (100) stack the specially cut package slices (203) obtained by means of the mould (93) in the compression chamber (90) thereon. There are stack holders (101) which have a dynamic structure that prevents the specially cut package slices (203) from being scattered on the package holder arms (100). The stack holders (101) press the specially cut package slices (203) by moving forward together with each specially cut package slice (203). At the same time, stacking stops (102) are placed at the end of the holder arms (100). The stacking stops (102) prevent the specially cut package slices (203) on the package holder arms (100) from bulging out.

There is a waste transmission portion (110) under the compression chamber (90) which transfers the waste packages (204) left from the specially cut package slices (203) cut from the straightened package (202) out, in order to be reused.

The working principle of the cornet cone package cutting machine according to the invention is as follows;

The package bobbin (200) coming out of the bobbin cylinder (10) is pulled towards the stretching elevation (20) and pulled open by means of the front stretching cylinder (30) and rear stretching cylinder (40). Then, the package directed at the lower stretching cylinder (50) is pulled in a downward direction and transferred upwards for the cutting procedure in an orderly manner. Pulled from the lower stretching cylinder (50) in an upwards direction, the package passes between the first straightening cylinders (60) and is transferred to the second straightening cylinders (80) connected to the straightening disks (70). The package is turned into a stretched package (201) and then a straightened package (202) during this motion.

The straightened package (202) transferred in the downward direction from the second straightening cylinders (80) is pressed by means of the compression piece (91) in the compression chamber (90) and cut by means of the mould (93), and specially shaped package slices (203) are obtained. The specially shaped package slices (203) are stacked on the package holder arms (100). The waste packages (204) left from the specially cut package slices (203) cut from the straightened package (202) are transferred from the waste transmission portion (100) out, in order to be reused.

The invention claimed is:

1. A cornet cone package cutting machine for use in production of cornet cone packages that are used in packaging ice cream, the cornet cone package cutting machine comprising:

a bobbin cylinder that carries a package;

a stretching elevation positioned at a distance from said bobbin cylinder, said stretching elevation having a front stretching cylinder and a rear stretching cylinder, the front stretching cylinder and the rear stretching cylinder adapted to open the package on said bobbin cylinder;

a lower stretching cylinder positioned at a distance from said stretching elevation, said lower stretching cylinder adapted to pull the package opened by the front stretching cylinder and the rear stretching cylinder downwardly and to transfer the downwardly pulled package upwardly;

a first straightening cylinder adapted to pull the package from said lower stretching cylinder upwardly so as to stretch the package;

a second straightening cylinder connected to straightening disks positioned opposite said first straightening cylinder so as to straighten the stretched package;

at least one compression piece having a back-and-forth motion, said at least one compression piece positioned below said second straightening cylinder, said at least one compression piece adapted to press on the straightened stretched package;

a compression chamber having at least one mould adapted to cut the straightened package that is pressed with said at least one compression piece so as to form package slices for a cornet cone;

a package holder arm extending forward of an outer surface of said compression chamber and adapted to stack the package slices from the compression chamber; and a waste transmission portion positioned below said compression chamber, said waste transmission portion adapted to transfer waste packages left from the package slices.

2. The cornet cone package cutting machine of claim 1, further comprising:

a drive motor drivingly connected to said at least one compression piece, said drive motor having rotational movement that causes the back-and-forth motion drive of said at least one compression piece.

3. The cornet cone package of claim 2, further comprising:

a circle arm that interconnects said drive motor and said at least one compression piece so as to transform the rotational movement of said drive motor into a linear movement.

4. The cornet cone package of claim 1, further comprising:

a stack holder positioned on said package holder arm.

5. The cornet cone package of claim 1, further comprising:

a stacking stop positioned at an end of said package holding arm and adapted to prevent the package slices from bulging out of said package holding arm.

* * * * *